United States Patent
Rezvani et al.

(10) Patent No.: US 7,080,046 B1
(45) Date of Patent: Jul. 18, 2006

(54) METHOD FOR AMORTIZING AUTHENTICATION OVERHEAD

(75) Inventors: Babak Rezvani, Ossling, NY (US); Jack L. Chen, Astoria, NY (US)

(73) Assignee: Xanboo, Inc., New York, NY (US)

( * ) Notice: Subject to any disclaimer, the term of this patent is extended or adjusted under 35 U.S.C. 154(b) by 70 days.

(21) Appl. No.: 09/684,012

(22) Filed: Oct. 6, 2000

Related U.S. Application Data

(60) Provisional application No. 60/230,319, filed on Sep. 6, 2000, provisional application No. 60/230,301, filed on Sep. 6, 2000.

(51) Int. Cl.
*G06F 17/60* (2006.01)

(52) U.S. Cl. .............................. 705/64; 705/26; 705/50

(58) Field of Classification Search .................... 705/1, 705/50, 51, 64, 26, 75
See application file for complete search history.

(56) References Cited

U.S. PATENT DOCUMENTS

| | | | | |
|---|---|---|---|---|
| 4,429,180 | A | * | 1/1984 | Unkenholz .................. 380/283 |
| 5,995,624 | A | | 11/1999 | Fielder et al. ................. 380/25 |
| 6,012,144 | A | * | 1/2000 | Pickett ........................ 713/201 |
| 6,070,171 | A | * | 5/2000 | Snyder et al. .............. 707/203 |
| 6,115,735 | A | | 9/2000 | Saito .......................... 709/200 |
| 6,125,349 | A | * | 9/2000 | Maher ........................... 705/1 |
| 6,163,771 | A | * | 12/2000 | Walker et al. ................ 705/18 |
| 6,173,400 | B1 | | 1/2001 | Perlman et al. ............. 713/172 |
| 6,212,634 | B1 | | 4/2001 | Geer, Jr. et al. ............ 713/156 |
| 6,286,099 | B1 | | 9/2001 | Kramer ....................... 713/172 |
| 6,542,076 | B1 | | 4/2003 | Joao ........................... 340/539 |
| 6,542,077 | B1 | | 4/2003 | Joao ........................... 340/539 |
| 6,549,130 | B1 | | 4/2003 | Joao ........................... 340/539 |
| 6,587,046 | B1 | | 7/2003 | Joao ...................... 340/539.14 |

FOREIGN PATENT DOCUMENTS

JP 10020783 A * 1/1998

OTHER PUBLICATIONS

"PC Dynamics Windows Security System Aug. 5, 1996", Newsbytes News Network, disclose tokens for authenticating the identity of a user.*
"Applied Cryptography" second edition, Schneier, 1996, Wiley and Sons.*

* cited by examiner

*Primary Examiner*—Calvin Loyd Hewitt, II
(74) *Attorney, Agent, or Firm*—Pollack, P.C.; Grant E. Pollack

(57) ABSTRACT

A method is disclosed for amortizing the authentication overhead of data transmissions. The method comprises establishing a first secure transmission of data between a transmitter and a receiver by transmitting at least one token to the receiver during the first secure transmission. There may be any number of senders and receivers, and any receivers may be a sender and vice versa. The method also comprises establishing at least one additional transmission of data between the sender and the receiver and transmitting the data and at least one token during the at least one additional transmission. In addition, the method compares the at least one token transmitted during the at least one additional transmission to the token transmitted during the first secure transmission to guarantee the authenticity of that at least one additional transmission.

The method may also include transmitting a preselected number of tokens during the first secure transmission. The number of additional transmissions may or may not correspond to the preselected number of tokens. The at least one additional transmission may be conducted over an unsecure connection using open communication. The first secure transmission may be protected or encrypted.

21 Claims, 8 Drawing Sheets

METHOD FOR AMORTIZING AUTHENTICATION OVERHEAD

This application claims benefit of Provisional Application 60/230,219 Sep. 6, 2000 and Provisional Application 60/230,301 Sep. 6, 2000.

FIELD OF THE INVENTION

The invention relates generally to network security and, more particularly, to the field of authentication.

BACKGROUND OF THE INVENTION

There are two major areas of the art of networking security, encryption and authentication. Encryption is a method of hiding or encrypting the data in transmission so that only the recipient may have access to the data in its unhidden or unencrypted form. This is also known as data privacy. Authentication on the other hand is a method of ensuring that a transmission that is sent from a sender to a receiver in fact came from the true sender. This is otherwise known as integrity. A method that provides encryption ensures that only the appropriate and intended receiver may possess the method to decrypt the data for use, and a method that provides authentication ensures that only an appropriate and valid sender of a transmission did indeed sign the message with a uniquely identifiable and verifiable signing method.

The area of security that the present invention is concerned with is authentication. There are two major groupings of authentication methods in use today, public key and private key methods. In private key authentication, the method employs a secret, shared key which is known only to the sender and the receiver. In providing key authentication, a data transmission is uniquely manipulated by use of an algorithm using the private key before being sent to the receiver. A receiver, receiving such a manipulated transmission, uses a reciprocal algorithm to the sender's algorithm and the sender's private key to uniquely read the message. Since only the sender and the receiver know the secret key, only the sender could have manipulated the message so that the receiver could read it.

The problem with private key authentication is the transfer of the sender's secret or private key to the receiver. In addition, secret keys in private key authentication are often breakable given the amount of computing power available today, and are difficult to maintain. In addition, the lifespan of the key is relatively short due to the inherent breakability and difficulty in securely transmitting the private key over an unsecure network. Typically, private key authentication is used when there is an out of band channel available to send private keys outside of the unsecure network, such as a military installation with a dedicated, secret radio key transmitter. Also, transmissions using private key authentication are often small due to the necessary processing overhead for each packet of the transmission; the larger the packet, the larger the overhead needed to run the secret algorithms on the data.

Public key authentication eliminates the secure key transfer problem inherent with private key authentication. In public key authentication, a pair of reciprocal keys is used between the sender and receiver, the sender's private and public keys. The unique property of public key authentication is that a message received and verified with an algorithm using the sender's public key could only have been signed using the sender's particular and reciprocal private key of that pair.

Public key methods make use of the property that extremely large numbers, the numbers used to manipulate the transmitted messages, are extremely expensive to factor into smaller numbers while the smaller numbers, which are the keys themselves, are very easy to multiply together to get the large cipher number. In each pair of keys used by the sender and the receiver, each of the entities holds one and only one of the keys as well as the multiplied large number. From this, it is easy to determine the content of the message through a mathematical algorithm which does not reveal the reciprocal key.

Because of these properties, many schemes, such as the widely used SSL and HTTPS, employ public key schemes. However, the expensive processing cost used in the algorithm needed to take the extremely large cipher number and manipulate the data with it make it very difficult for typical servers receiving appreciable traffic to use because of the high per transaction authentication costs. Unlike private key cryptography, there is no benefit for very small transactions as small data sizes still take a significant initial processing investment to get started. Therefore, the public key schemes are suited for large transmissions with fewer transactions, but unsuitable for the high frequency, smaller transactions typically found on the Internet.

With both public and private key cryptography, processing is done on a per-transmission basis, resulting in bloated processing on the entity which is performing the authentication. With the processing power available to malicious individuals spying on network traffic, it is also impractical to vary the keys of the private key method at a high enough frequency because of the difficulty of sending the shared keys securely over an unsecure network. The only way to reduce the processing overhead is to reduce the authentication strength, to decrease the frequency of key refreshes in private key methods, and to reduce the size and strengths of the keys in public key authentication. This, of course, is unacceptable for sensitive information such as credit card information, stock trading activity, and voting which frequently needs to be sent through unsecure networks.

Thus, there exists a need for efficiently authenticating data from a user transmitting over an unsecure network that requires both low processing overhead, yet still prevents a third-party from impersonating the data from a legitimate user.

SUMMARY OF THE INVENTION

A method is disclosed for amortizing the authentication overhead of data transmissions. The method comprises establishing a first secure transmission of data between a transmitter and a receiver by transmitting at least one token to the receiver during the first secure transmission. There may be any number of senders and receivers, and any receivers may be a sender and vice versa. The method also comprises establishing at least one additional transmission of data between the sender and the receiver and transmitting the data and at least one token during the at least one additional transmission. In addition, the method compares the at least one token transmitted during the at least one additional transmission to the token transmitted during the first secure transmission to guarantee the authenticity of that at least one additional transmission.

The method may also include transmitting a preselected number of tokens during the first secure transmission. The number of additional transmissions may or may not correspond to the preselected number of tokens. The at least one additional transmission may be conducted over an unsecure connection using open communication. The first secure transmission may be protected or encrypted.

The method may also include transmitting a checksum value during the first transmission and having a receiver verify that the checksum value is accurate by comparing the transmitted value to a checksum value generated using a similar checksum algorithm at the receiver. A Checksum value may also be included during the at least one additional transmissions. The generation of the checksum value during the at least one additional transmissions may also depend on data or checksum values from any or all previous and future checksum values of other at least one additional transmissions or the first secure transmission.

An adaptive scheme may be included that varies the number of tokens and additional transmissions to vary the authentication strength.

BRIEF DESCRIPTION OF THE DRAWINGS

For a more complete understanding of this invention, reference should now be made to the embodiments illustrated in greater detail in the accompanying drawings and described below.

In the drawings.

DETAILED DESCRIPTION OF THE PREFERRED EMBODIMENT

Overview of System Architecture

Client-Side

Figure 1:
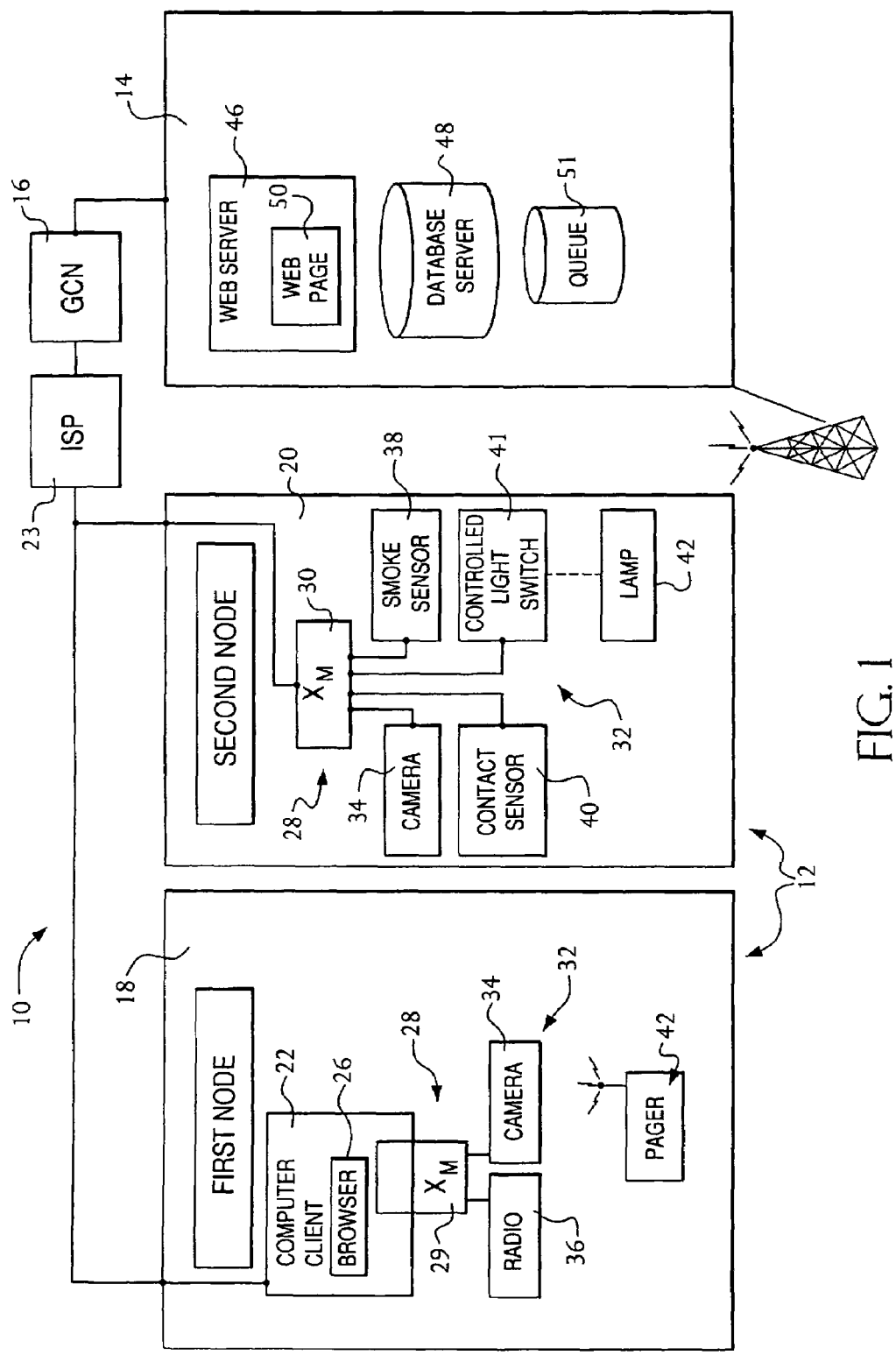
FIG. 1 is a schematic view of one embodiment of a client server system in accordance with the present invention.

In FIG. 1 there is shown a client and server system 10 in accordance with the present invention. The client server system 10 includes a client 12 and a server 14 which are connected via a global computer network 16, such as the Internet.

The client 12 is operated by a local user (not shown). The client 12 may comprise a plurality of nodes, such as first user node 18 and second user node 20. It should be understood that the nodes 18 and 20 may be located at a single location, such as the user's house or at separate locations such as the user's main house and the user's vacation house. The present invention contemplates a plurality of local user locations and/or a plurality of remote user locations.

In one form of the invention, the user node 18 includes a client computer 22 that is connected to the global computer network 16 via an Internet Service Provider (ISP) 23 by any conventional means, such as a dial-up connection, DSL line, cable modem, satellite connection, or T1 line. The client computer 22 includes an Internet browser program 26 for accessing web pages via the global computer network 16.

A monitoring module 28 is also provided which serves as a gateway between the server 14 and at least one connected device 32. The monitoring module can take various forms, such as a software program 29 running on the client computer (as shown at node 18). Alternately, the monitoring module 28 can take the form of a stand-alone appliance 30 (as shown at node 20) which is connected to the global computer network 16 and operates separately and independently from the client computer 22. The monitoring module 28 is described in greater detail below.

At least one, and preferably a plurality of, device or appliance 32 is connected to and controlled by each monitoring module 28. The connection between the monitoring module 28 and the various devices 32 can be wired or wireless.

The appliances 32 encompass a multitude of devices which are capable of being controlled or mediated by an external controller. Such appliances include camera 34, radio 36, smoke or fire detector 38, contact sensor 40, and light switch 41. Although not illustrated, it should be understood that the present invention encompasses many other such devices such as various audio input and output devices, various visual displays, washers/driers, microwave ovens, cooking ranges, car alarms, plant watering devices, sprinkler, thermostats, carbon monoxide sensors, humidistats, rain gauges, video cassette recorders, radio tuners, and the like.

In addition, a myriad of notification devices, such as pager 42, can also be incorporated into the system. As best seen in FIG. 1, the pager 42 is in wireless communication with a wireless or cellular transmitter 44 associated with the server component 14. Other notification devices besides the pager 42 are also contemplated by the present invention including, e-mail clients, wireless hand-held computers, wireless wearable computer units, automatic web notification via dynamic web content, telephone clients, voice mail clients, cellular telephones, instant messaging clients, and the like.

Server-Side

The server 14 of the present invention includes a web server 46 and a database server 48. The web server 46 generates static web pages and dynamic web pages from data contained in the database server 48. The web pages 50 can be viewed by the user on the Internet browser 26 running on the client computer 22.

It is contemplated that the client 12 and the server 14 communicate over the global computer network 16 via the conventionally available TCP/IP environment using the HTTP protocol. Of course, it should be understood that any request-response type of protocol and socket-based packet transport environment would also be suitable and within the scope of the contemplated invention.

It is also contemplated that the server 14 of the present invention functions as the master controller of the system 10. In addition, the client-server configuration of the system 10 and the connection of the system 10 to the global computer network 16 via an ISP 23 allow a user to access the system 10 via any computer, monitoring appliance or similar device connected to the global computer network 16.

In this way a user is able to control and monitor a plurality of devices 32 connected to the monitoring module 29 at node 18 and a plurality of devices 32 connected to the networked monitoring module 30 at node 20. The devices 32 can be accessed via any personal computer 22 by accessing the control server 14 via the global computer network 16. By using a global computer network 16 it should be clear that a user, or anyone the user permits access to, can readily monitor and control the monitoring modules 28 at nodes 18 and 20, from any location, using any suitable device that has access to the global computer network 16.

The Monitoring Module

Figure 2:
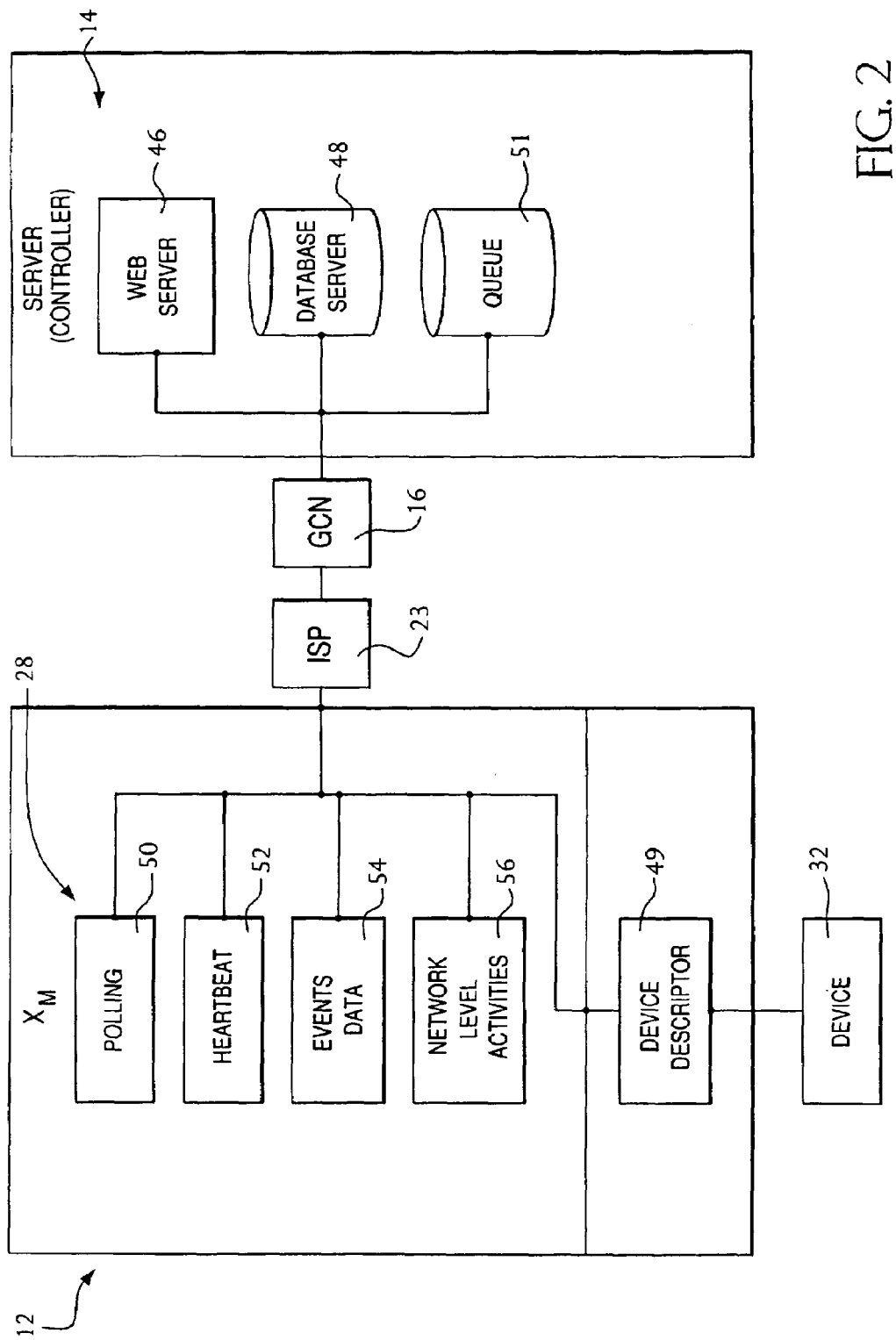
FIG. 2 is a schematic view of the client and server components of the system shown in FIG. 1.

Referring now to FIG. 2, the monitoring module 28 serves as the connection hub for the controlled devices 32 and as the gateway for brokering communications between the devices 32 and the control server 14 via the global computer network 16.

One of the functions of the monitoring module 28 is to serve as a translation and brokering agent between the server 14 and the connected devices 32. In its software form 29, the monitoring module 28 comprises a plurality of dynamically loaded objects, or device descriptors 49 that allow the server 14 to interface with the connected devices 32. The dynamically loaded device descriptors 49 act as the device drivers for the connected devices 32, translating, in both directions, the monitoring, command, and control data sent and received from the monitoring module 28 to the server 14 via the global computer network 16. Each device descriptor 49 also translates the signals received from the monitoring module 28 into the specific electrical signals that are required to communicate with, both input and output, and control its associated device 32. In addition, because each device 32 has its own specific interface and requires a specific set of electrical signals to monitor and control it, a different device descriptor 49 must be provided for each specific model of each device 32.

The monitoring module 28 also controls the communication between the server 14 and the connected devices 32 via the global computer network 16. The HTTP protocol employed by the existing global computer network is a stateless protocol. Since the knowledge of the current state of the connected devices is vital to the successful operation of the system 10, it is necessary for the monitoring module 28 to store the persistent state of the connected devices 32 and to provide a system for periodically updating and obtaining the state of each connected device 32 and for obtaining commands from the server 14. The monitoring module 28 does this by polling 50 the server 14 and maintaining a system heartbeat 52.

The monitoring module 28 polls 50 by scheduling a transmission between the monitoring module 28 and the server 14 in which it checks for commands from the server 14. If commands are waiting on the server 14, the server will return commands in an algorithmic manner, that can take various forms, for processing and also informs the monitoring module that N commands are waiting in the queue. The monitoring module 14 will then poll the server 14 and retrieve data from the server 14 until there are no more commands in the queue. In this way, commands from the server 14 can be delivered to the monitoring module 28 to effect changes in the devices 32 over the stateless medium of the existing global computer network 16.

In a typical polling operation 50, the client computer 22 issues a command for incurring a change in state of one of the control devices 32. The change in state command is posted to a data store 51, such as a command queue associated with the server 14. Similarly, if server 14 desires to make an internal change to monitor 28, such as setting or modifying the polling 50 or heartbeat 52 time intervals, these commands are likewise posted to the storage device 51. Upon reaching the end of the current polling interval, the monitoring module 28 sends a transmission to the server 14, requesting any queued commands. The monitoring module 28 continues to poll, using a preselected transmission scheme, until the queue of commands waiting for the monitor 28 is complete. Each command received from the queue is acted upon when it is received and any associated state changes are effected. The server 14 transmits an acknowledgment of receipt and successful processing of the data back to the monitoring module 28.

The monitoring module 28 is also responsible for maintaining a heartbeat 52 or a scheduled periodic update regime to refresh the current state of the devices 32 stored in the database server 48. The primary function of the heartbeat 52 is to synchronize the states of the devices 32 and the virtual representation of those devices stored on the server 14. The heartbeat 52 also functions to send device events and state changes between the devices 32 and the server 14 to effect this synchronization of the control server 14 and to assure that the monitoring module 28 and the server 14 are synchronized.

Not only is the monitoring module able to send commands to the server 14, but the server 14 is able to send commands back to the monitoring module 28. The types of transmissions that cause the server 14 to send unsolicited transmissions back to the monitoring module 28 are to set or update the heartbeat or polling time and to issue a command to update a component of a device.

In a typical heartbeat operation 52, the monitoring module 28 sends a transmission to the server 14 in response to a change in state of a connected device 32, a synchronization of a control device 32 with server 14, a triggered alert event, or the like. In such a heartbeat operation 52, all data intended to be transmitted to the server 14 is transmitted to the server 14 via the global computer network. The server 14 transmits an acknowledgment of receipt and successful processing of the data back to the monitoring module 28.

Along with maintaining the polling and heartbeat operations and sending and receiving events, data, and commands 54 to and from the server 14, the monitoring module 28 also takes care of many network level activities 56 such as verifying passwords, dialing up the ISP if necessary, periodically uploading accounting/billing information, and performing security measures.

Another function of the monitoring module 28 is the storage of the persistent state of the devices 32. In the event that the user's computer 22 crashes and the monitoring module 28 must be restarted, many of the parameters that were negotiated between the monitoring module 28 and the server 14 during the registration process are stored in the memory of the monitoring module.

Device Interface and Descriptors

Figure 3:
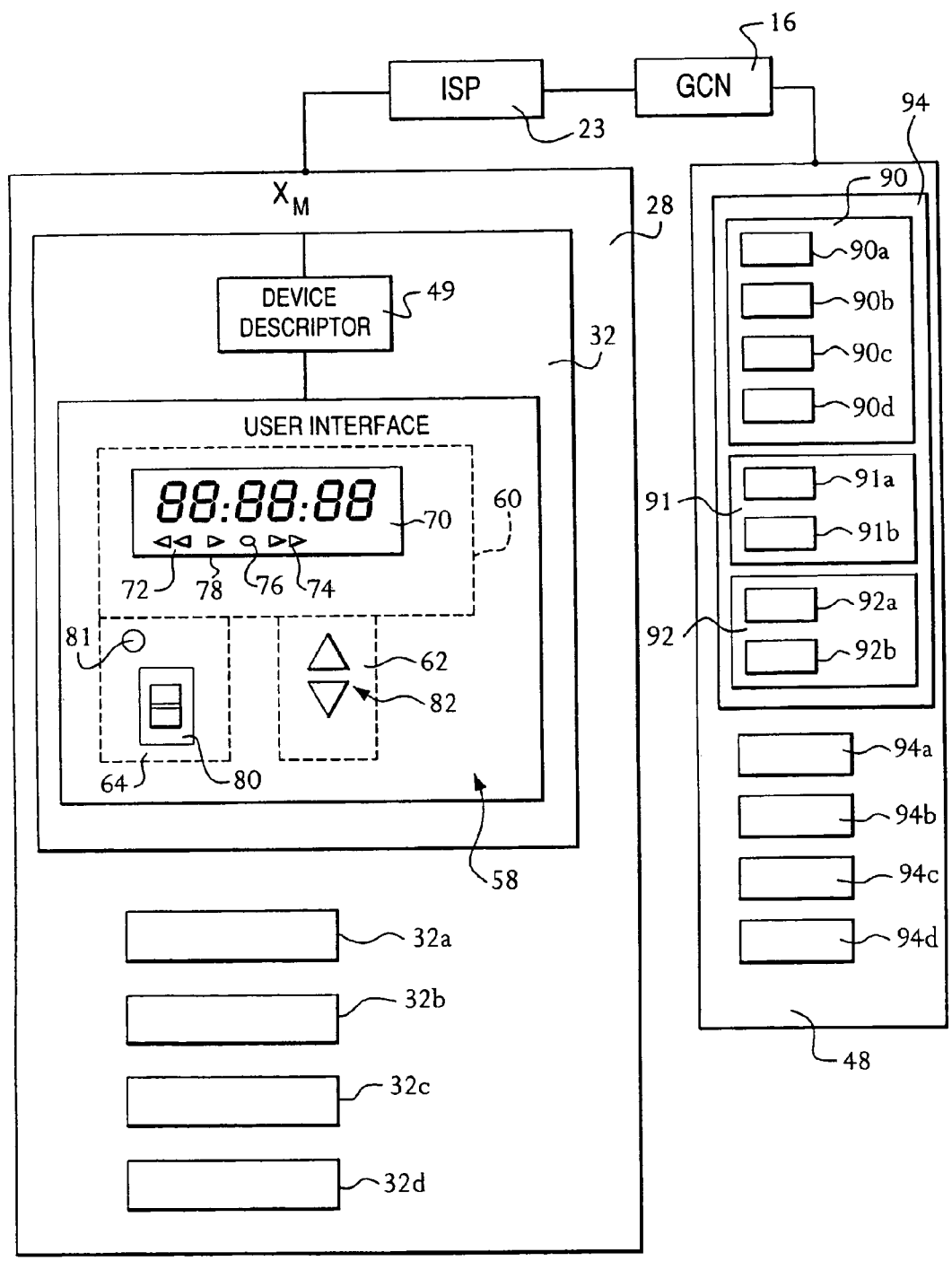
FIG. 3 is a schematic view of the controlled devices and virtual representation of same in the server database of the system shown in FIG. 1.

Referring now to FIG. 3, a series of devices 32, 32a, 32b, 32c, 32d is shown. Each device is connected to a monitoring module 28 via a device descriptor or driver 49 (only one shown). Each device includes a customizable user interface 58 that is viewable on the client computer 22 over the global computer network 16 through a virtual representation of the user interface stored on the web server 46, as explained below. The user interface 58 comprises at least one resource or sub-devices 60, 62, and 64. Typically, a resource provides a specific functionality of the device. For example, the device shown in FIG. 3 represents a VCR having a recording setting resource 60, a channel selecting resource 62, and a power selecting resource 64. Of course, a typical VCR would have many other operational resources, but the resources illustrated are sufficient to describe the basic operation of the device.

Each resource 60, 62, 64 is made up of components or the basic building blocks of the user interface 58 of the device. For example, the recording setting resource 60 comprises a display component 70 and a series of pushbuttons 72, 74, 76, 78 which activate the VCR's fast forward, reverse, play, and stop functions, respectively. The channel selecting resource 62 comprises the display component 70 and a pair of pushbuttons 82 which activate the up channel and down channel functions of the VCR. The power selecting resource 64 comprises a toggle switch 80 for activating the VCR's power on and power off commands and an LED indicator 81 which indicates the power condition of the VCR.

A virtual representation of each device 32, 32a, 32b, 32c, 32d also exists as a record 94, 94a, 94b, 94c, 94d in the database server 48 of the control server 14. Each record contains an entry for each resource and its associated components which make up the device. For example, The record 94 for the VCR device 32 contains an entry 90, 91, 92 for each resource 60, 62, 64 and an entry 90a, 90b, 90c, 90d, 91a, 91b, 92a, 92b for each component 70, 72, 72, 74, 80, 81, 82, respectively. In addition, a web page 50 can be generated by the web server 46 by extracting the associated record for that device from the database server 48 and creating a graphical, textual, tactile, aural, or other similar modality user interface representation of that device which a user can access via the Internet browser 26.

Basic Operation of the System

In operation, the client 12 first registers with the server component 14 to begin using the services offered therein by accessing the web server 46 of the server component 14 via the client browser 26. At this point, an account is opened for the client 12 and the user's information is stored in the database server 48. If it has not been previously registered, the monitoring modules 29 and 30 would also be registered with the server component 14 and their information would also be stored in the database server 48 and associated with the node 18. Once the monitoring modules 29 and 30 have been registered, any device 32 that is attached to either of the monitoring devices 29 and 30 would also be registered in the system, stored in the database server 48, and available to the user. Each device 32 communicates with the monitoring modules 29, 30 and either exports its interface to the database server 48 or otherwise obtains a default interface configuration, as explained in greater detail below. These interfaces, as described in greater detail below, are adapted to be displayed, to be viewed, and to be interacted with by the user via the client browser 26 over the global computer network 16 by accessing the web server 46.

A few uses of the present system 10 will now be explained to aid in the understanding of the operation. For example, the contact sensor 40 could be associated with the front door (not shown) at the remote location 20 and set to trip whenever the front door is opened. The camera 34 is also positioned to view the front door location and can be programmed to take a digital photograph whenever the sensor contact 40 is tripped and transmit that photograph to be stored in the database server 48. When, in fact, the contact sensor 40 detects that the front door has been opened, an event notification or alarm trigger is transmitted by the monitoring module 30 to the database server 48 which has been previously programmed to transmit a notification event to the user's pager via the cellular transmitter 44. As the contact sensor is tripped, the camera 34 takes a picture of the front door and transmits that picture via the monitoring module 30 via the global computer network 16 to the database server 48. The user, having been notified via the pager 42, can now access the web server 46 of the server component 14 via his Internet browser 26 to retrieve the photograph that has been stored on a database server 48. In this way, the user can determine whether an intruder has entered via the front door of his vacation home or whether his family has just arrived for their vacation.

Another use for the system 10 would be for the user located at the node 18 to be able to control his lamp 42 at his vacation home located at node 20. The user would contact the web server 46 via his Internet browser 26 to access the database entry of the light switch 41. A virtual representation of the light switch 41 would be available on the web server 46 and could be manipulated by the user to remotely change the state of the light switch 41 and the connected lamp 46, say from being "off" to being "on." To do this, the user would simply manipulate the on/off virtual representation of the light switch on the web server 46 and this command would be placed in a queue of waiting commands on the server component.

Periodically, the controlling module or monitor 30 polls the server component 14 looking for waiting commands, such as the change state command of the light switch 41. Thereafter, the command would be transmitted to the monitoring device 30 which would instruct the light switch to change from the "off" state to "on" state, and, thus, turning on the lamp 46. This change in state of the lamp 46 could be viewed by an appropriately positioned camera, such as camera 34, which would be used to visually monitor the remote location 20 to determine whether the command had been completed successfully.

The Method and System for Amortizing the Authentication Overhead

Having described a complex preferred network system in FIGS. 1–3, FIGS. 4–8 describe a simplified preferred network system to facilitate an understanding of the underlying concepts of the present invention and the scope to which those concepts can be extended.

Figure 4:
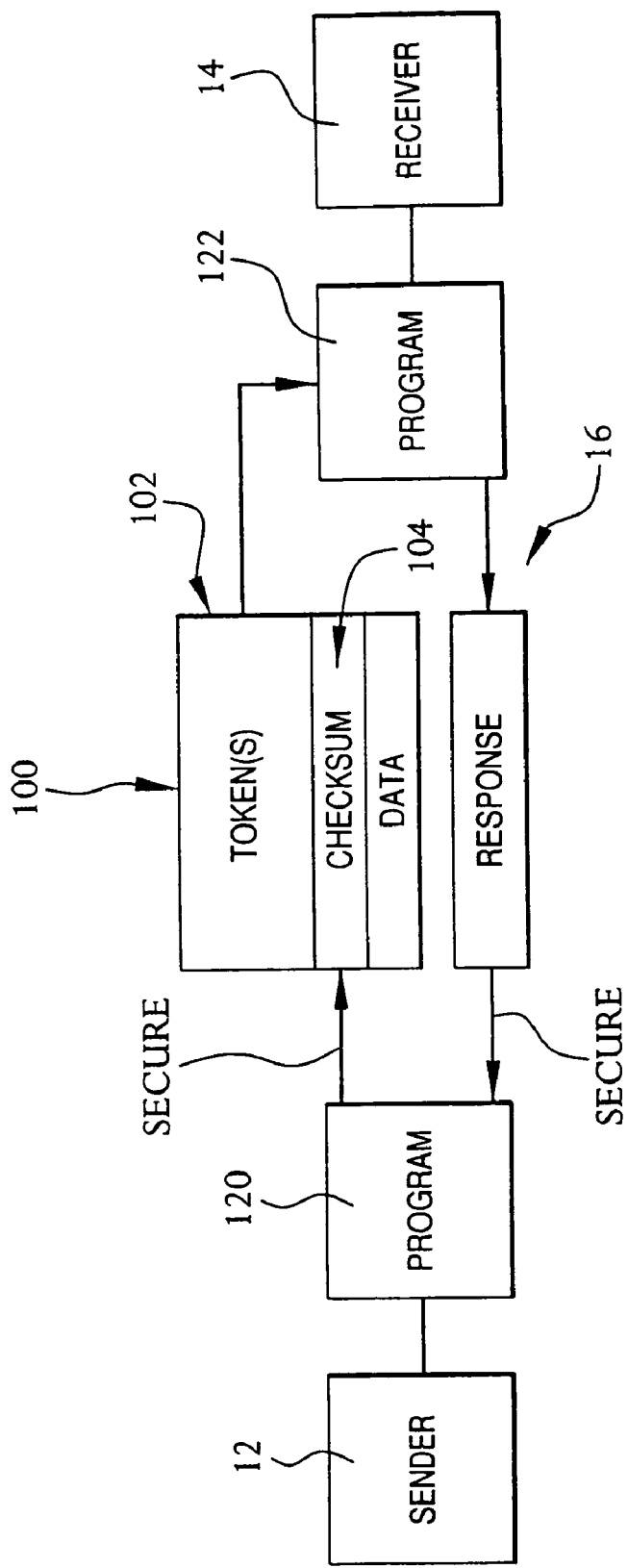
FIG. 4 is a schematic of a generic sender and receiver system employing the authentication scheme of the present invention using a secure transmission.

Referring now to FIG. 4, in the present invention there are two main entities, a sender 12 and a receiver 14 which communicate over a global network 16, which is preferably a packet switched network. The protocol disclosed is particularly advantageous in a client server environment, although it may also be employed in any peer to peer environment. It should also be apparent that the system contemplates a plurality of senders 12 and/or a plurality of receivers 14 which are in communication over various local and global networks 16.

While in the current implementation the sender 12 is a computer, it should be understood that the sender 12 can be any entity which transmits data to a destination, including a receiver which transmits data back to the sender. Other suitable senders may include, but are not limited to, home appliances, cameras, home gateways, and the like. Similarly, the receivers can be any entity which is capable of receiving data, including clients that receive return data transmissions from receivers. Suitable receivers include, but are not limited to, database servers, web servers, gateways, firewall servers, ISP gateways, network enabled cameras, networked home appliances, and the like.

Many different types of networks which the senders 12 use to communicate with the receivers are also contemplated by the present invention 14. These networks may be of any size and may reach and travel over a plurality of media, not limited to, wired and wireless networks.

The present invention includes a sender computer 12 communicating over a global network 16, such as the Internet, to a receiver computer 14. The present implementation also includes a software program 120 running on the sender computer 12 which packages and sends data to another program 122 running on the receiver 14 via the global computer network 16. In the present implementation, programs 120 and 122 are implemented in software; however, the functionality of the software programs may also be implemented in hardware, firmware, or the like.

In one preferred embodiment, the software program 120 running on the sender 12 can generate and transmit many different data forms, types, and amounts over the network 16 and may be processed by the software 122 running on the receiver 14. This data may include, but is not limited to, large video streams, acknowledgment messages, requests for data, email messages, and the like. Also as part of the present invention, the software 120 is used to perform client-side authentication of data transmissions sent to the software 122 running on the receiver 14 and the software 122 is used to process data from a plurality of the senders 12, some of which may be correctly authenticating data and some of which may not correctly authenticate the source of the data. In addition, the present invention contemplates a number of different protocols by which data is transmitted from the sender 12 to the receiver 14. The primary protocol used is HTTP, but other suitable protocols include and are not limited to, TCP, IP, FTP, UDP, HTTPS.

Having described the preferred embodiment of the present invention in FIGS. 1–8, it should be apparent that the sender/client 12 would typically have multiple transactions to perform with the server 14 over the global computer network 16. The nature of the data being sent from the sender/client computer 12 to the receiver/server 14 must be absolutely verifiable that the data indeed was from the sender/client computer 12 and not some other source, such as a malicious third party or even a network aberration. Since the global computer network 16 is an unsecure network, the protocols used to transmit data from sender 12 to the server 14 via the network 16 themselves provide no means for authentication.

The data is transmitted over the network as a large number of small transmissions, each requiring authentication. Since the protocols in use, HTTP, TCP, UDP, and FTP are stateless, such that information from one transmission is independent of other transmissions and is discrete by transmission, authenticating a previous transmission cannot aid in authenticating later transmissions. Because the present invention requires transmission-level authentication for a large number of transmissions being sent on an unsecure network where illegitimate data could be sent to receiver 14, it is clear that a light-weight, transmission-level authentication scheme is necessary to guarantee that the data sent from the sender 12 to the receiver 14 is indeed legitimate data.

Using a private key scheme such as 3DES within a protocol, such as HTTPS, attempts to guarantee authentication; only a legitimate sender 12 with the secret, shared key can manipulate the data such that the receiver 14 can reverse the data manipulation algorithm and view the data. As the sender 12 increases the key size to insure greater difficulty in compromising the key, the processing power necessary to run the manipulation and reverse manipulation algorithms increases on both the sender 12 and the receiver 14. To combat this, the sender 12 might employ a large enough key, but may refresh the secret key via a secure means, such as SSL. Again, the increased frequency of key refreshes increases the processing power needed for the private key methods both on the sender 12 and the receiver 14, because secure transmissions, such as SSL, are expensive themselves.

A public key scheme, as described in the background section, is very expensive in terms of computer power for even very small transmissions such as in the current system because of the initial algorithm overhead each time it is used. Decreasing the key size does decrease the computer power necessary, but it also cannot provide a sufficient authentication level when decreased to a size that reduces the computer processing load on the sender and receiver to an acceptable level. To remedy the deficiencies in private and public key schemes before-mentioned, the current system employs a hybrid scheme which guarantees that third parties will not be able to impersonate the sender 12 and that is capable of authenticating transmissions while using a low amount of processing power on both the sender 12 and receiver 14 to run the algorithms.

Figure 5:
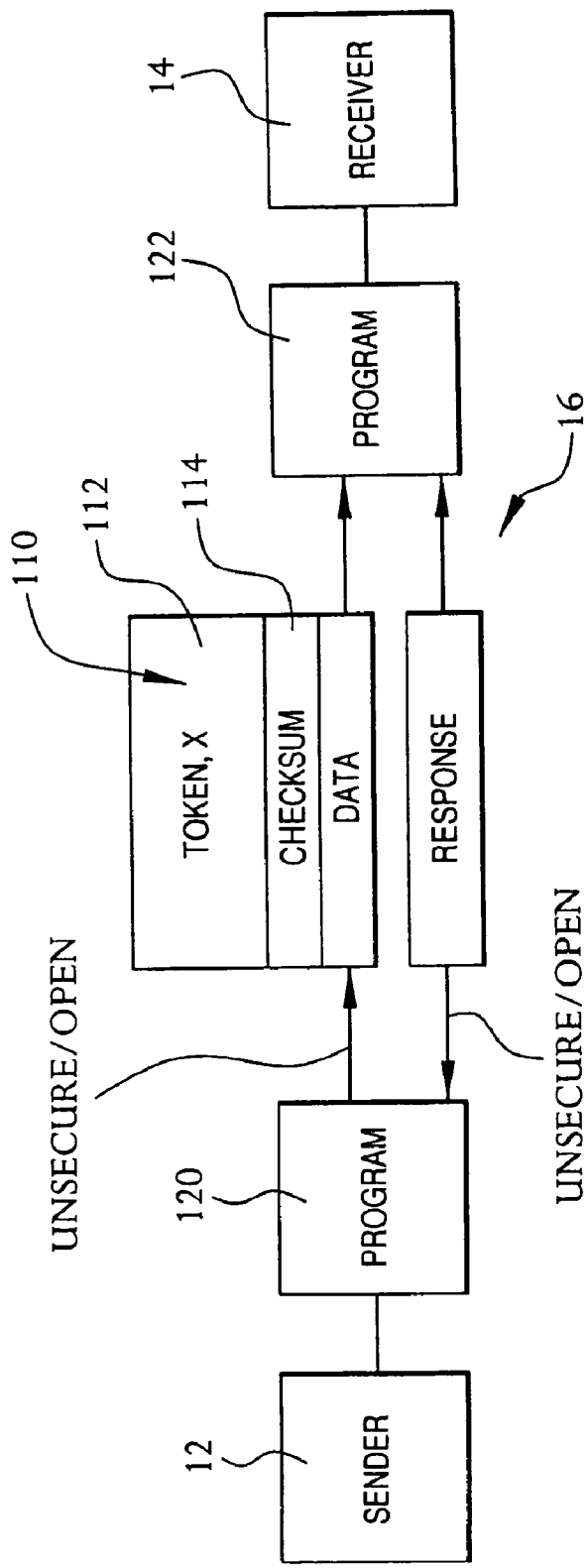
FIG. 5 is a generic sender and receiver system employing the authentication scheme of the present invention using a less secure or unsecure transmission of the present invention.
Figure 6:
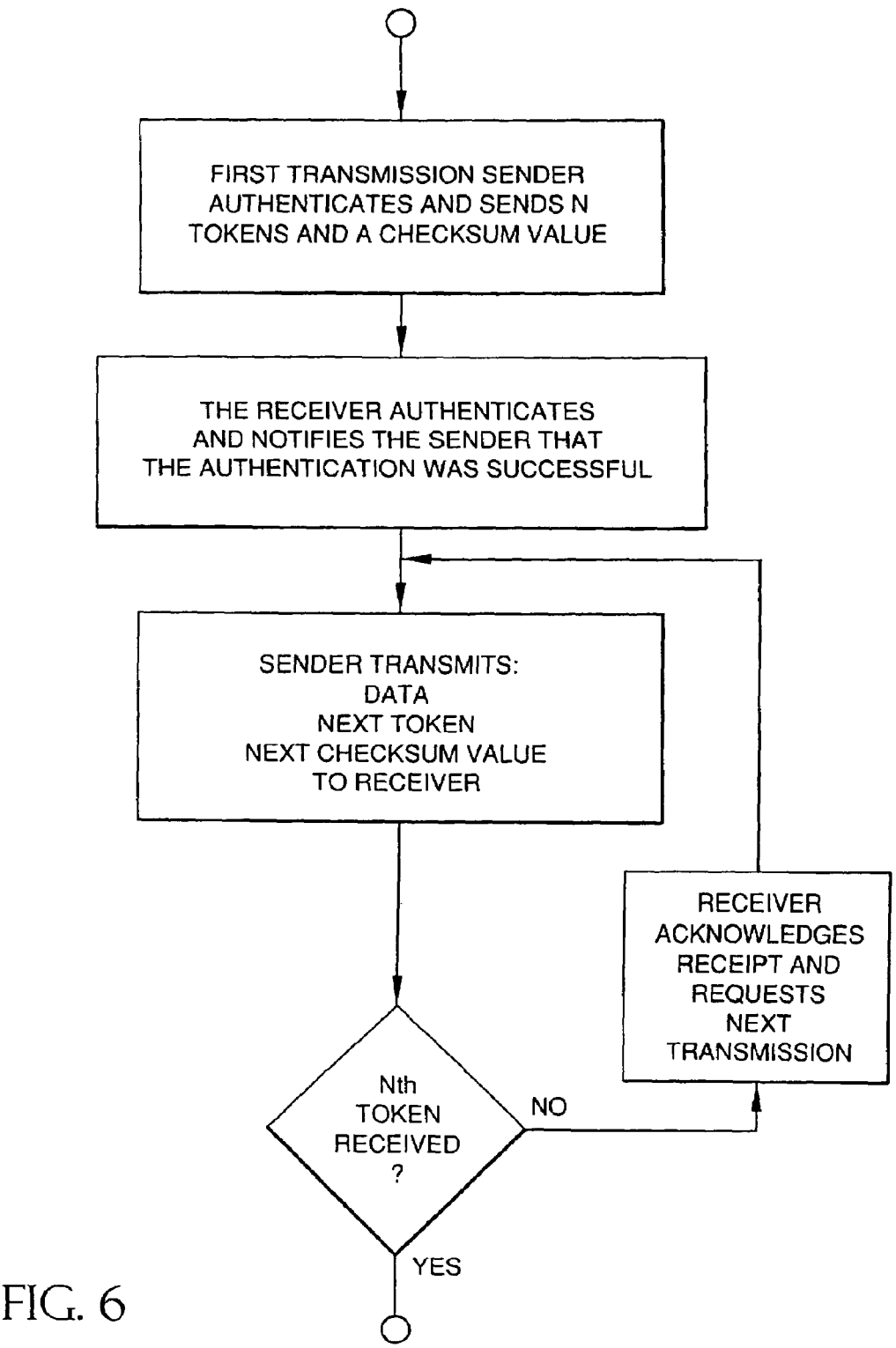
FIG. 6 is a flow chart showing the steps of performing the method of the present invention.
Figure 7:
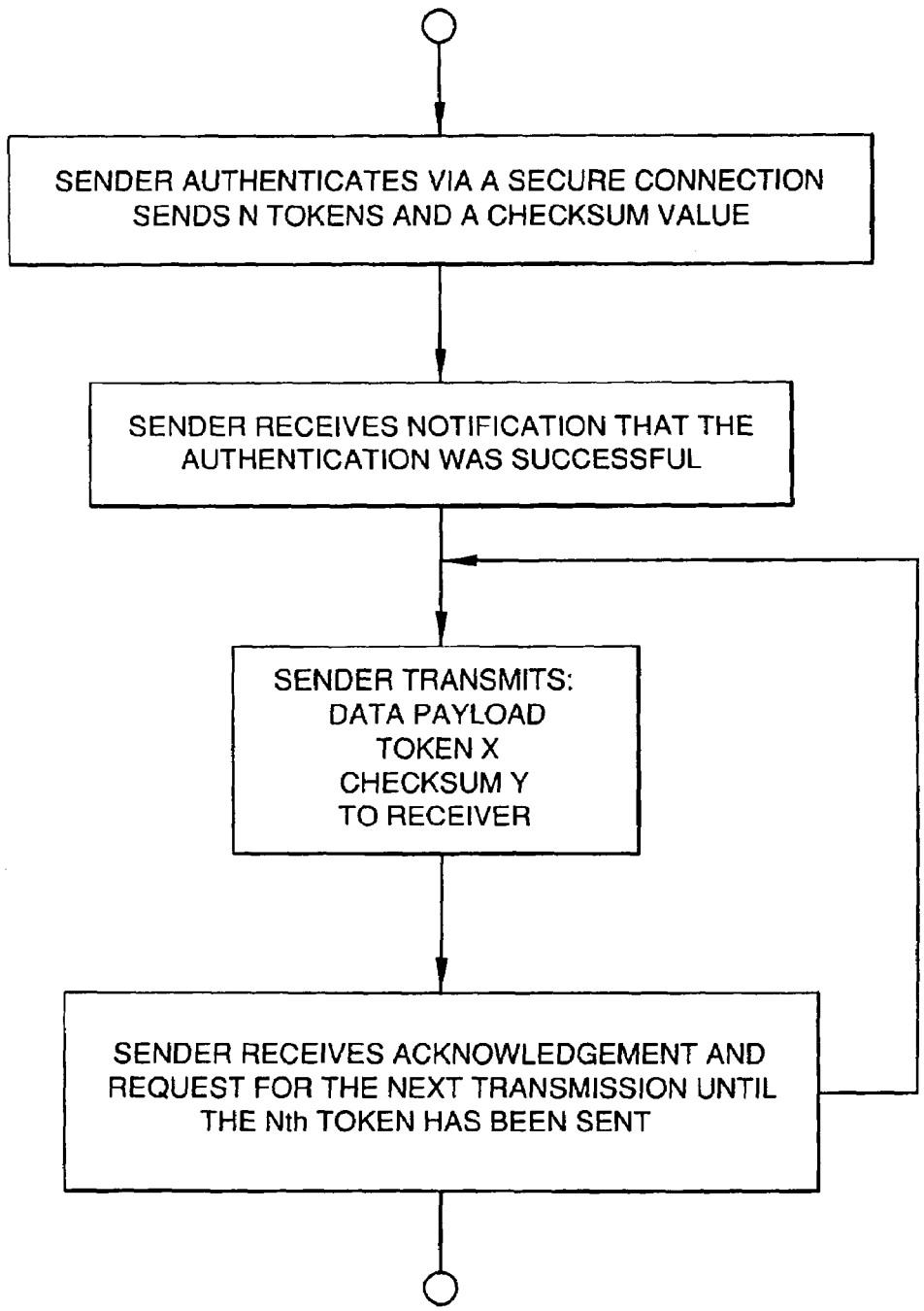
FIG. 7 is a flow chart showing the sender performing its portion of the method of the present invention.
Figure 8:
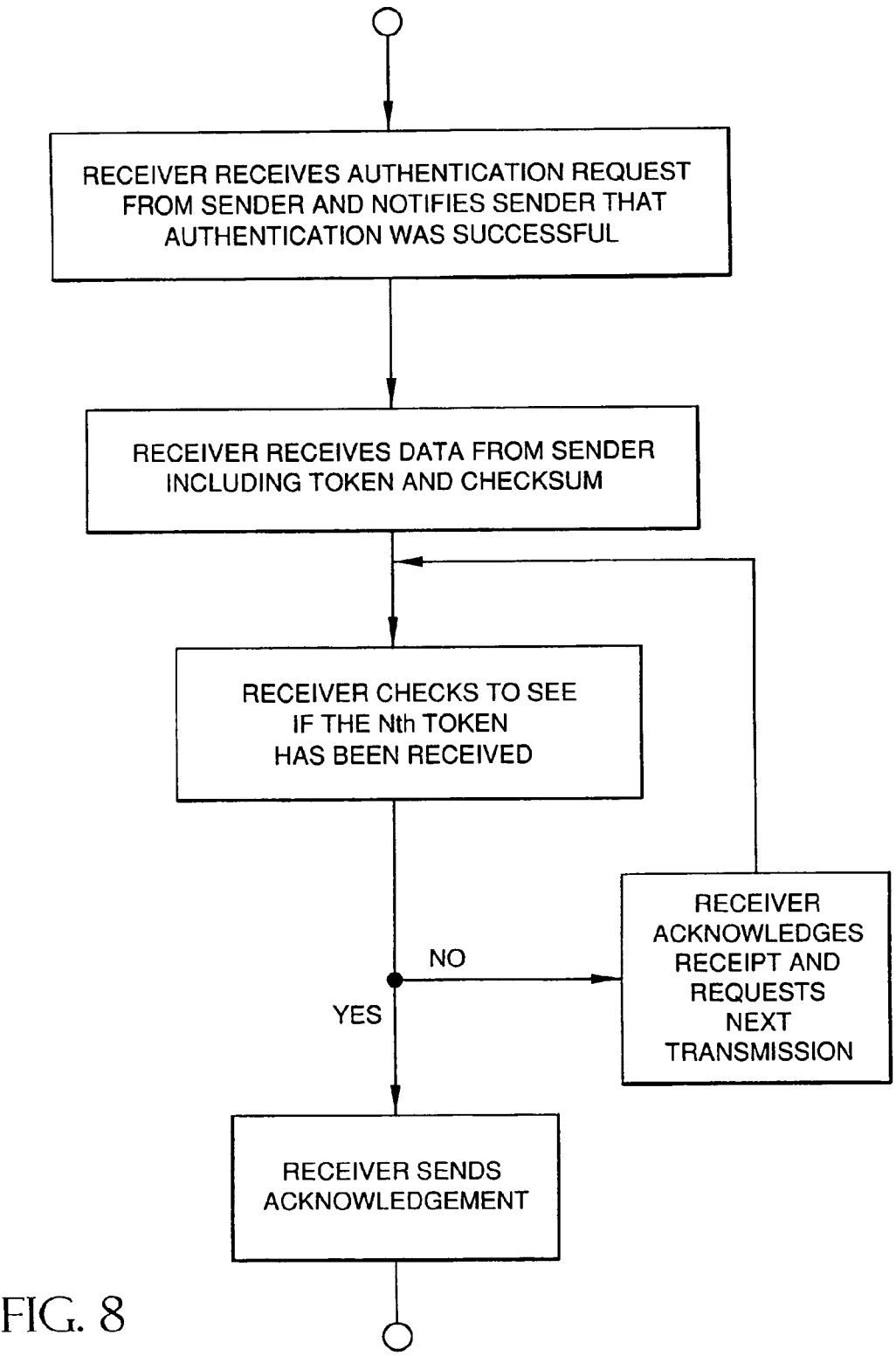
FIG. 8 is a flow chart showing the receiver performing its portion of the method of the present invention.

The authentication method and system of the present invention is illustrated in FIGS. 5–8, and uses the combination of a secure connection for at least the initial transmission, such as that afforded by SSL, and also a less secure token and an optional checksum tracking system for subsequent transmissions. As shown in FIGS. 4 and 6, the sender 12 sends a first transmission 100 to the receiver 14 via the global computer network 16. This first transmission 100 is conducted via a secure connection, such as that afforded by SSL. For example, the sender 12 could connect to the server using the HTTPS protocol, which uses as one of it's negotiable algorithms, SSL.

In this first transaction 100, the sender 12 fully authenticates itself, sending the necessary authentication information to the receiver 14. Included in this first transmission 100, the client may also include N tokens 102. A token may be any suitable unique identifier, such as a fixed data string or number.

A checksum value 104 may also be sent to heighten the security scheme in the first transmission 100. The tokens 102 and the check sum 104 may be encrypted along with the rest of the first transmission 100 or sent via an otherwise secure connection. In the preferred embodiment, the packet for the first secure transaction includes the source, address, destination address, N tokens, an optional checksum seed, and the data payload.

If the first transmission 100 is successfully received and processed, the receiver 14 sends its response 106 back to the sender 12 as an acknowledgment.

The subsequent N transmissions are illustrated in FIGS. 5 and 6. The subsequent N transmissions can be preferably performed over the global computer network in an unsecured or open environment. For example, the subsequent transmissions can be sent using any open communication, such as plain text. Of course, the subsequent transmission may also be securely sent.

Not utilizing an authentication algorithm, except matching a token against a set of tokens previously sent, means that the processing overhead to verify these tokens is extremely low. During each subsequent transmission 110, the sender 12 includes one of the N tokens 112 along with whatever data 116 is being sent during transmission 110 to the receiver 14. The receiver 14 checks the token 112 against its list of N tokens previously sent to determine whether the transaction is valid. In the preferred embodiment, the packet for the subsequent transmission includes the source, address, the destination address, token x, checksum y, and the data payload.

In addition to the transmitted token 112, the client could also send a new checksum value 114. This latest checksum value 114 would be used to further validate the current transaction. The checksum procedure could be any conventional checksum procedure wherein the algorithm can be only known by the sender and the receiver and each checksum value transmitted between the sender and the receiver is based on a previously generated checksum value or based on a part or parts of a previous transmission or transmissions. For example, the checksum algorithm may take the current checksum value and add it to the checksum value generated for the previous transmission. The resulting value, x, would be run through any suitable algorithm such as, checksum=$x^2+x^3$. This checksum value is transmitted to the receiver, whereupon it is checked for accuracy.

In this way, a third party who snoops one of the tokens and includes it in a later impersonated transaction would still fail in the authentication procedure at receiver 14 since, unless the snooper retained all sufficient previous transmissions and knew how the checksums were secretly generated from the current transmission and all sufficient previous transmissions, the checksum would be incorrectly generated at the later transmission.

The effect of the present hybrid security scheme is that it is no longer necessary to execute an expensive procedure to authenticate every transmission except for the first transmission, as it might be necessary in using currently available authentication schemes. Thus, the processing power necessary to effect authentication of the transmissions is reduced while also reducing or eliminating a third party's ability to properly send authenticated transmissions to the receiver 14.

The process of sending transmissions 110 with data 116 and checksums 104 and one of the tokens 102 continues until the receiver 14 receives a notification message 118, which can simply be a new secure first transmission or an explicit end-of-round message, that the current round of transmissions is over. Then, the process is terminated. If the client 12 still needs to send additional data to receiver 14, the process would be repeated starting from sending the first transmission 100 until all the data has been communicated between the sender 12 and the receiver 14.

By using the current hybrid system, the system is able to dynamically throttle the processing overhead required to transmit all the necessary data between the sender and the receiver while eliminating the potential threat of a third party impersonator. For example, if the threat of impersonation was low and it is desired to maintain a low processor overhead, the value N and/or the number of transmissions in a round of the algorithm could be set high to reduce the number of times that the processing of secure first transmission need take place. In contrast, the value of N and/or the number of transmissions in one round of the algorithm could be set lower when the threat of impersonation may be higher.

To give a further example, if it were determined that the need for authentication was low when the client computer 12 was sending a large quantity of data over the global computer network 16, such as when a publicly broadcast, large digital photograph or streaming video was sent, the value of N could be set high. Similarly, if the need for authentication was deemed to be higher, such as when a credit card order was sent, the value of N and/or the number of transmissions in a round of the algorithm could be set lower. In this way, it is possible to finely tune the required security for many different types of transmissions.

In another preferred embodiment of the present invention, the value N and/or the number of transmissions in a round of the algorithm is adaptively varied based upon a preselected set of criteria, such as the client's usage patterns, the frequency of transmission, and the like to vary the amount of processing necessary per transmission.

In the present adaptive scheme, the number of tokens, N, is a variable. Each time that a first transmission is performed, the client informs a server what the new value of N is and includes N number of tokens to be used later to authenticate the client. In addition, the server may instruct the client to restart the transmission process with a new "first" secure transmission based on the process or server requirements on its end.

In determining and setting the value N, the clients and/or server can take into account any combination of the following criteria:

1. The frequency of transmission from the client to server as compared to an average frequency. If the frequency is higher than the average frequency, then the value is set higher. Alternatively, if the frequency is less than the average frequency, then the value N could be set lower.
2. The "closeness" of the client to the part of the web site concerning a large number of transactions. For example, once a client has logged into the system, and travels closer to the video storage page by accessing introductory pages, the value N could be decreased by the server in anticipation of receiving a large number of transactions, such as a continually updated digital video feed.
3. Client usage patterns. For example, if a particular client has logged on at noon consistently during the past week, then it is likely that this client will be loging on again today at noon and transmitting data. In such an instance, the variable N could be proactively increased at noon in anticipation that it will again log on and transmit data. Similarly, if a client located on the east coast of the United States does not log onto server 14 during normal sleeping hours, i.e., between 12:00 a.m. and 7:00 a.m., then the variable N could be reduced since it is unlikely that data will be sent by them during this time.

It should be understood that other quality of service issues may be factored into the above-identified scheme to allow the server to modify the value N. In addition, other criteria similar to those set forth above are contemplated and could be employed as part of the present invention.

It is contemplated that all or some of the aforementioned criteria will be used in any conventional algorithm, such as statistical averaging scheme which accounts for each of the criteria proportional to their importance and effect on the processing overhead for authenticating the client. In this way, the present invention can control the authentication strength responsively and proactively, instead of being limited to responding to only past conditions.

Some of the advantages inherent in such an adaptive scheme include the following: the system can automatically adjust the performance overhead as a response to monitored conditions instead of requiring outside intervention to change the security strength parameters; the algorithm can be used by clients of varying processor power and varying network bandwidth connections to the server without predefining parameters at the install time (this is done by increasing the number of tokens when a set of transmission is started, if the process or capability is low on the client);

the server and the client both can dictate the security processor overhead in response to conditions that are occurring on their respective ends; the power of the algorithm is increased as the processing power necessary to process individual transmissions grow smaller; and the larger the number of transmissions, the more efficient the algorithm is.

A similar adaptive scheme is described in U.S. patent application Ser. No. 09/684,013 entitled "Adaptively Controlled Resource and Method for Controlling the Behavior of Same" filed on Oct. 6, 2000 the specification of which is incorporated by reference herein in this entirety.

While certain preferred embodiments and various modifications thereto have been described or suggested, other changes in these preferred embodiments will occur to those of ordinary skill in the art which do not depart from the broad inventive concepts of the present invention. Accordingly, reference should be made to the appended claims rather than the specific embodiment of the foregoing specification to ascertain the full scope of the present invention.

What is claimed is:

1. A method for authenticating transferred data between a sender computer and a receiver computer over an open network, the method comprising the steps of:
    establishing a first secure transmission of data between the sender computer and the receiver computer;
    assigning a value to a variable N where the value of N is a positive number and defines a selected number of additional transmissions:
    transmitting selected authentication information including N number of tokens and a checksum value from the sender computer to the receiver computer during the first secure transmission so as to allow the sender computer to authenticate itself, each of the N number of tokens being a unique identifier;
    transmitting an acknowledgment from the receiver computer to the sender computer, upon successful receipt and processing of the first transmission by the receiver computer;
    establishing at least one additional transmission of data between the sender computer and the receiver computer;
    transmitting the data and at least one of the N tokens from the sender computer to the receiver computer during the at least one additional transmission;
    comparing the at least one of the N tokens transmitted from the sender computer during the additional transmission to each of the tokens transmitted from the sender computer during the one or more previous transmissions to determine whether the most recent additional transmission is authentic;
    establishing a second secure transmission between the sender computer and the receiver computer;
    assigning a second value to the variable N where the second value of N is a positive number and defines a second selected number of additional transmissions; and
    transmitting the second value of N, a second value of N number of tokens, and a second checksum value to be used to authenticate the sender computer, from the sender computer to the receiver computer, each of the second N number of tokens being a unique identifier.

2. The method set forth in claim 1, wherein the at least one token comprises a preselected number of tokens.

3. The method set forth in claim 2, wherein the number of at least one transmissions corresponds to the preselected number of tokens.

4. The method set forth in claim 3, wherein the at least one additional transmission is sent in plaintext.

5. The method set forth in claim 2, wherein the number of at least one transmissions is greater than the preselected number of tokens.

6. The method set forth in claim 2, wherein the number of at least one transmissions is less than the preselected number of tokens.

7. The method set forth in claim 6, wherein the at least one additional transmission is sent in plaintext.

8. The method set forth in claim 2, wherein the first secure transmission is encrypted.

9. The method set forth in claim 8, wherein the transmitted checksum value is based upon checksum values transmitted during previous transmissions.

10. The method set forth in claim 1, wherein the at least one additional transmission is conducted over an unsecure or open connection.

11. The method set forth in claim 1, wherein the first secure transmission is encrypted.

12. The method set forth in claim 1, wherein the at least one additional transmission is sent in plaintext.

13. The method set forth in claim 1, further comprising the steps of transmitting a checksum value during the first transmission and having the receiver verify that the checksum value is accurate by comparing the transmitted value to a equivalent value generated using a similar checksum algorithm.

14. The method set forth in claim 1, wherein the additional transmissions are variable and adaptively selected, at least in part, based upon the performance overhead of the system.

15. The method set forth in claim 1, wherein the additional transmissions are variable and adaptively selected, at least in part, based upon monitored conditions.

16. A method for securely transferring data between a client computer and a server over an open network, the method comprising the steps of:
    establishing a first secure transmission between the client computer and the server which is encrypted;
    assigning a preselected value to a variable N where the preselected value of N is a positive number and defines a selected number of additional transmissions;
    transmitting selected authentication information including the preselected value of N number of tokens and a checksum value from the client computer to the server during the first secure transmission so as to allow the sender computer to authenticate itself, each of the N number of tokens being a unique identifier;
    transmitting an acknowledgment from the server to the client computer, upon successful receipt and processing of the first transmission by the client computer;
    establishing additional transmissions between the client computer and the server corresponding to the preselected number of tokens N;
    transmitting the data, one of the preselected value of N number of tokens and the checksum value from the client computer to the server during each additional transmission;
    during each additional transmission, comparing the token transmitted from the client computer to the server during such additional transmission to the corresponding token transmitted during the first secure transmission to determine whether the additional transmission is authentic;

establishing a second secure transmission between the client computer and the server;

assigning a second value to the variable N where the second value of N is a positive number and defines a second selected number of additional transmissions; and transmitting the second value of N, a second value of N number of tokens, and a second checksum value to be used to authenticate the client computer, from the client computer to the server, each of the second N number of tokens being a unique identifier.

17. The method set forth in claim 16, wherein the additional transmissions are sent in plaintext.

18. The method set forth in claim 16, further comprising the steps of transmitting a checksum value during the first transmission and having the receiver computer verify that the checksum value is accurate by comparing the transmitted checksum value to a checksum value generated using an equivalent algorithm.

19. The method set forth in claim 16, wherein the transmitted checksum value is based upon checksum values transmitted during previous transmissions during this transaction.

20. The method set forth in claim 14, wherein the algorithm is a statistical averaging algorithm.

21. A method for authenticating transferred data between a sender computer and a receiver computer over an open network, the method comprising the steps of:

establishing a first secure transmission of data between the sender computer and the receiver computer;

assigning a value to a variable N where the value of N is a positive number and defines a selected number of additional transmissions;

transmitting selected authentication information including N number of tokens and a checksum value from the sender computer to the receiver computer during the first secure transmission so as to allow the sender computer to authenticate itself, each of the N number of tokens being a unique identifier;

transmitting an acknowledgement from the receiver computer to the sender computer, upon successful receipt and processing of the first transmission by the receiver computer;

establishing at least one additional transmission of data between the sender computer and the receiver computer;

transmitting the data and at least one of the N tokens from the sender computer to the receiver computer during the at least one additional transmission;

comparing the at least one of the N tokens transmitted from the sender computer during the additional transmission to each of the tokens transmitted from the the sender computer during the one or more previous transmission(s) to determine whether the most recent additional transmission is authentic; and establishing a second secure transmission between the sender computer and the receiver computer;

assigning a second value to the variable N where the second value of N is a positive number and defines a second selected number of additional transmissions;

transmitting the second value of N, a second value of N number of tokens, and a second checksum value to be used to authenticate the sender computer, from the sender computer to the receiver computer, each of the second N number of tokens being a unique identifier; and each of the additional transmissions being variable and adaptively selected, at least in part, based upon a set of criteria used in an algorithm to determine the number of additional transmissions, the criteria being selected from a group consisting of the frequency of transmissions between the sender computer and the receiver computer, the closeness of the sender computer to the source of the transactions, and the usage patterns of the sender computer.

\* \* \* \* \*